United States Patent [19]

Fresch et al.

[11] Patent Number: 4,738,692
[45] Date of Patent: Apr. 19, 1988

[54] GAS DRYING APPARATUS

[76] Inventors: Vincent P. Fresch, P.O. Box 672, Elm Grove, Wis. 53122; Mashud A. Awad, 1508 Virginia St., Racine, Wis. 53405; Anthony R. Rossi, 14090 Providence La., Brookfield, Wis. 53005

[21] Appl. No.: 57,700

[22] Filed: May 26, 1987

Related U.S. Application Data

[63] Continuation of Ser. No. 829,310, Feb. 14, 1986, abandoned.

[51] Int. Cl.$^4$ ............................................. B01D 53/04
[52] U.S. Cl. ............................................. 55/26; 55/33; 55/58; 55/62; 55/74
[58] Field of Search .................. 55/33, 35, 62, 161, 55/162, 179, 180, 208, 387, 74, 58, 26

[56] References Cited

U.S. PATENT DOCUMENTS

| | | | |
|---|---|---|---|
| 2,434,419 | 1/1948 | Laughlin et al. | 55/33 X |
| 2,535,902 | 12/1950 | Dailey, Jr. | 55/33 |
| 2,625,237 | 1/1953 | Gribler et al. | 55/179 X |
| 2,712,981 | 7/1955 | Beggs | 55/33 |
| 2,944,627 | 7/1960 | Skarstrom | 55/179 X |
| 2,975,860 | 3/1961 | Westeren | 55/33 X |
| 2,979,828 | 4/1961 | Westeren | 55/33 X |
| 3,024,867 | 3/1962 | Milton | 55/33 |
| 3,078,634 | 2/1963 | Milton | 55/33 |
| 3,138,439 | 6/1964 | Skarstrom | 55/33 |
| 3,155,471 | 11/1964 | Schymik et al. | 55/162 |
| 3,164,452 | 1/1965 | Westeren et al. | 55/179 X |
| 3,552,096 | 1/1971 | Dayson | 55/179 X |
| 4,205,967 | 6/1980 | Sandman et al. | 55/179 X |
| 4,306,889 | 12/1981 | Krüger et al. | 55/179 X |
| 4,479,815 | 10/1984 | Tinker et al. | 55/179 X |
| 4,552,570 | 11/1985 | Gravatt | 55/179 X |

FOREIGN PATENT DOCUMENTS 1400536  7/1975  United Kingdom .................... 55/33

Primary Examiner—Robert Spitzer
Attorney, Agent, or Firm—Andrus, Sceales, Starke & Sawall

[57] ABSTRACT

A twin tower gas drying apparatus in which the towers alternately receive moisture saturated air to be dried and then receive dry air to regenerate the desiccant which had previously adsorbed moisture from the saturated air includes purge valves which release the air used for regeneration of the desiccant into the atmosphere and controls for the purge valves that alternately open and close the purge valve during regeneration so that the tower being regenerated is alternately pressurized and depressurized during regeneration so that the amount of air released through the purge valve is limited without causing a dew point elevation of the dry air.

3 Claims, 2 Drawing Sheets

GAS DRYING APPARATUS

This is a continuation of co-pending application Ser. No. 829,310, filed Feb. 14, 1986, now abandoned.

BACKGROUND OF THE INVENTION

This invention relates to a gas drying apparatus and more specifically to a twin tower gas drying apparatus.

The presence of moisture in gases leads to difficulties in many industries and operations. With a slight drop in temperature, condensation can occur in pipelines and reservoirs which can lead to corrusion, scales, freeze-ups, dirt, etc. which may damage instruments and controls and cause blockages in airlines, produce excessive pressure drops, increase down-time and reduce the life of tools. Similarly in chemical, food and metal working industries, the presence of moisture in the air and gases produces undesired oxidation. It has also been found that the robotics field requires extremely dry air for the operation of its pneumatic systems.

In order to produce extremely dry air i.e., dew points of minus 40° Farenheit or lower, it is necessary to use an adsorptive drying system. Typically, adsorption drying is done by means of twin towers filled with a desiccant. The basis for the twin tower adsorption method is that while one tower is receiving moisture laden air for drying, the other tower is having its desiccant regenerated by passing dry air through that tower. In the past, this regeneration process has been accomplished by taking a portion of the dry air exiting the tower in the drying cycle and passing this air through the other tower to absorb moisture from the desiccant in that tower and thus regenerate that desiccant. Typically, 15% of the dry air exiting the tower in the drying cycle is utilized to regenerate the other tower. This method has the obvious disadvantage of diverting 15% of the dry air away from its end use in order to utilize it for regenerating one of the towers. Therefore, it is desirable to have a system that could reduce the amount of dry air needed to regenerate the towers to an amount that is considerably less than 15%.

SUMMARY OF THE INVENTION

A twin tower gas drying apparatus in which the towers alternately receive moisture saturated air to be dried and then receive dry air to regenerate the desiccant which had previously adsorbed moisture from the saturated air includes inlet valves for each of the towers for introducing saturated air under pressure into the tower and control means to alternately open and close the inlet valves so that only one of the towers receives saturated air during a drying cycle.

In accordance with another aspect of the invention, the apparatus includes regeneration valves for each of the towers for introducing dry air into the tower during a regeneration cycle so that the dry air absorbs moisture from the desiccant and regenerates the desiccant. The apparatus also includes means to alternately open and close the regeneration valves so that only one of the towers receives dry air during a regeneration cycle.

In accordance with yet another aspect of the invention, each of the towers includes a purge valve for releasing the air used for regeneration of the desiccant into the atmosphere and control means are provided to alternately open and close the purge valves during regeneration so that the tower being regenerated is alternately pressurized and de-pressurized during regeneration and thus the amount of air released through said purge valve is limited.

The present gas drying apparatus provides a system for limiting the amount of air needed for regeneration of the towers thus allowing a greater percentage of the air exiting the drying tower to be utilized in plant operations.

BRIEF DESCRIPTION OF THE DRAWINGS

The drawings illustrate the best mode presently contemplated of carrying out the invention.

In the drawings.

DESCRIPTION OF THE PREFERRED EMBODIMENT

While the invention has been particularly shown and described with respect to a preferred embodiment thereof, it will be understood by those skilled in the art that the foregoing and other changes in form and details may be made therein without departing from the spirit and scope of the invention.

Figure 1:
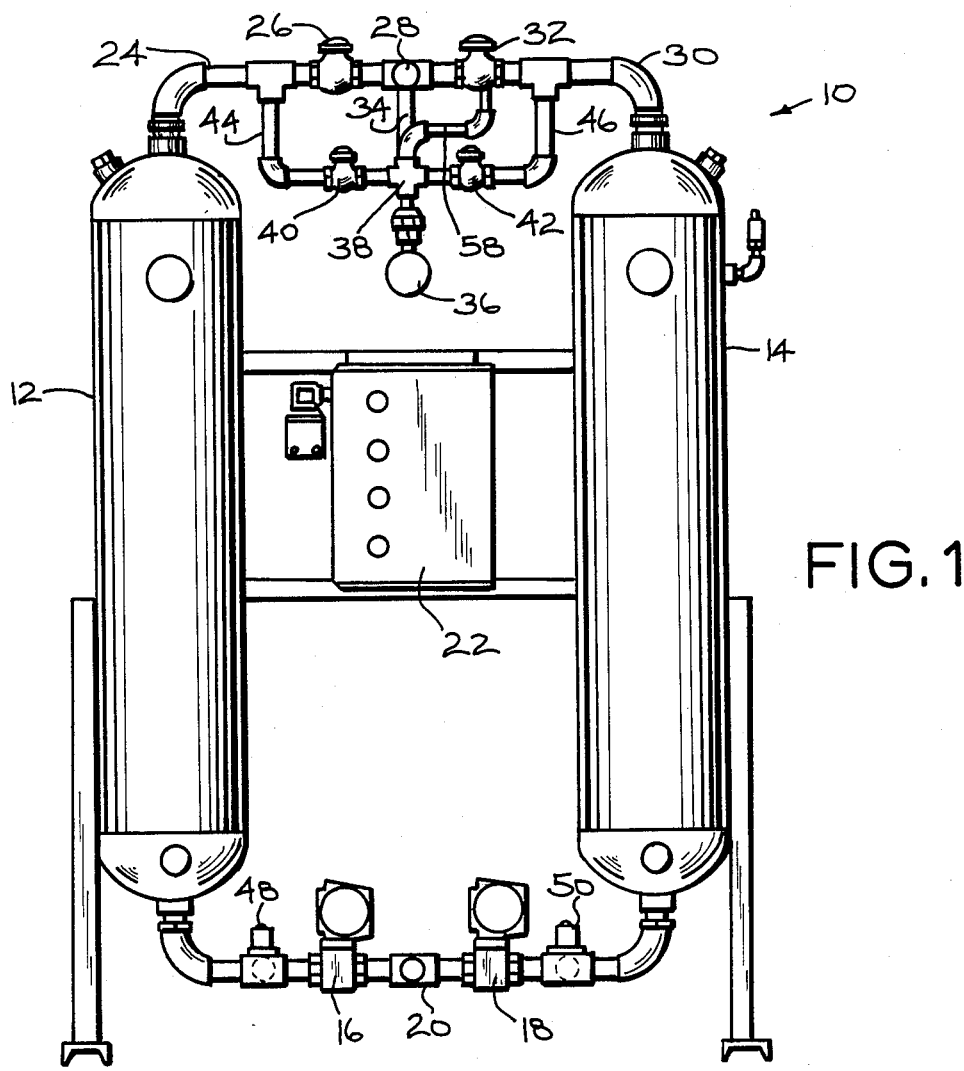
FIG. 1 is a front elevational view of a gas drying apparatus constructed according to the invention.

As shown in FIG. 1, gas drying apparatus 10 includes a pair of towers 12 and 14. These towers contain a desiccant such as activated alumina coated with calcium chloride. The twin tower system allows one of the towers to be utilized for drying air while the other tower is having its desiccant regenerated.

Each of the towers is provided with an inlet valve 16 and 18, respectively, which when open allows saturated air entering the system through inlet 20 to pass upwardly through the tower and the desiccant therein thus allowing the desiccant to adsorb the moisture from the air.

Figure 2:
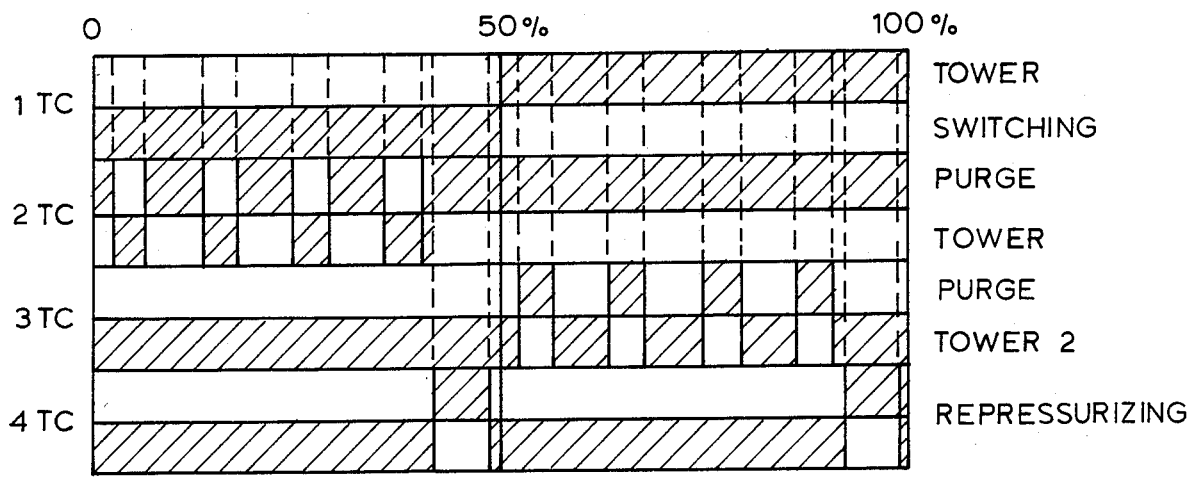
FIG. 2 is a chart showing the sequence of operation for the cam switches that operate the various valves of the apparatus in FIG. 1.
Figure 3:
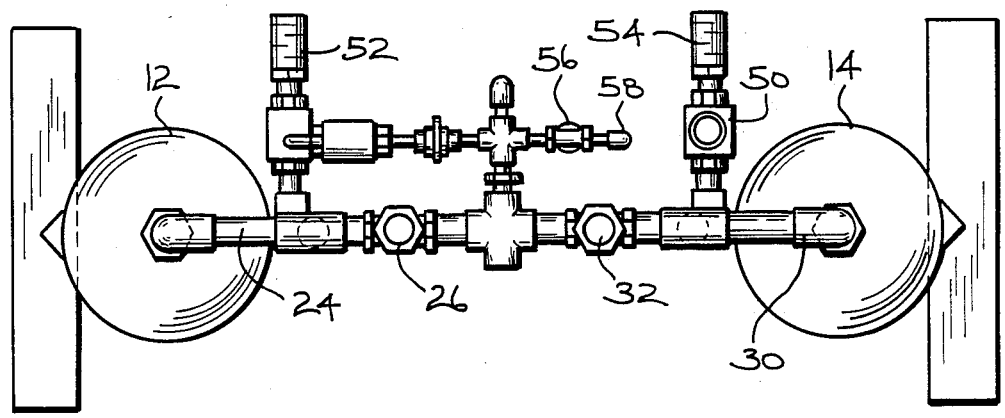
FIG. 3 is a plan view of the apparatus in FIG. 1.

The opening and closing of valves 16 and 18 as well as the opening and closing of other valves in the system is controlled by rotating a cam type timer located in control box 22. As the cams rotate into and out of position switches are opened and closed causing solenoids to open and close the various valves in the system. The timing of the cam operated valves and their opening and closing is shown in FIG. 2 and will be described in detail below. This valve sequencing can also be accomplished with an electronic or pneumatic timing device rather than the mechanical device described herein.

As dry air exits the upper portion of tower 12 it passes through conduit 24 and unseats one way check valve 26 so that the dry air may pass to and through outlet 28. Similarly when tower 14 is in the drying cycle, dry air exits the top of tower 14 through conduit 30, unseats one way check valve 32 and exits outlet 28.

A portion of the dry air that arrives at outlet 28 is diverted through conduit 34 by means of a purge adjusting valve (not shown). The amount of dry air passing through conduit 34 is monitored by meter 36 and the purge valve is adjusted so that the desired amount of dry air is diverted. Once diverted into conduit 34 the dry air passes through an orifice in union 38 and from there through either regeneration valve 40 or 42. Regeneration valves 40 and 42 are one way check valves that only allow flow in a direction from union 38 toward conduits 44 and 46 respectively. Thus, if tower 12 is in a drying cycle and is providing pressurized dry air to conduit 24, this pressure will be realized in conduit 44 and one way check valve will be forced into a seated position and will not allow flow from conduit 44 towards union 38. On the other hand, tower 14 will be in a regenerating cycle since tower 12 is in a drying cycle. Thus, one way check valve 42 will not experience any biasing pressure from conduit 46 and the pressure of the dry air in conduit 34 and union 38 will unseat regeneration valve 42 and allow dry air to pass from union 38 into conduit 46. Since the pressure on the left side of check valve 32 is greater than that on the right side, the dry air in conduit 46 will pass through conduit 30 and downwardly through tower 14 thus regenerating the desiccant in tower 14. Each of the towers is also provided with a purge valve 48 and 50, respectively. When the purge valves are open, the air used for regeneration passes out through muffled openings 52 and 54.

Gas drying apparatus 10 is also provided with a repressurization valve 56 which when open will provide pressurized dry air to union 38 via conduit 58 and from there to one of the towers at the end of its regenerating cycle. The pressurization valve 56 is opened to provide pressurized air to a tower prior to its entering a drying cycle so that the introduction of pressurized saturated air into the bottom of the tank at the beginning of its drying cycle does not disturb the desiccant in the drying tower.

In describing the operation of gas drying apparatus 10 we will assume that tower 12 is initially in a drying phase and that tower 14 is initially in a regenerating phase. Reference will also be made to FIG. 2 which shows the sequence of operation for the various camming switches that control the opening and closing of the inlet valves and the purge valves. In FIG. 2 "1TC" refers to a first timer cam switch which activates inlet valves 16 and 18. "2TC" refers to a second timer cam switch which operates purge valve 48 and "3TC" refers to a third timer cam switch which operates purge valve 50. "4TC" refers to a fourth timer cam switch which activates repressurization valve 56. The shaded areas in FIG. 2 designate a closed switch contact while the open areas designate an open switch contact.

The typical cycle for drying and regeneration is ten minutes and thus the 50% line in FIG. 2 would represent the five minute mark in the total cycle. At the five minute mark the process reverses i.e., tower 12 which was in a drying phase now goes to a regenerating phase and tower 14 which was in a regenerating phase goes to a drying phase.

In operation, with tower 12 in a drying phase, first timer cam switch, "1TC", opens valve 16 and closes valve 18 so that saturated air entering the system through inlet 20 passes through valve 16 and into the bottom of tower 12. It should be noted that when valve 16 has been opened by the first timer cam switch purge valve 48 has been closed by the third timer cam switch, "3TC". Thus, all of the air passing through valve 16 is forced into the bottom of tower 12. The air entering inlet 20 is at a pressure of approximately 100 psig and at a temperature of approximately 100° Fahrenheit. As the air passes upwardly through tower 12 the desiccant adsorbs the moisture from the saturated air and introduces pressurized dry air into conduit 24 with the dry air having a dew point of approximately −40° Fahrenheit.

The pressurized dry air in conduit 24 will unseat check valve 26 and act on check valve 40 via conduit 44 to keep it in a closed position. As the air passes through outlet 28, a portion of the dry air is diverted into conduit 34 and passes through union 38 to unseat check valve 42. The dry air then passes through conduit 46 and conduit 30 to be passed downwardly through tower 14. During this regeneration cycle the second timer cam switch, "2TC" alternately opens and closes so that purge valve 50 is pulsed, i.e., alternately opened and closed. In prior art drying systems purge valve 50 would be left open throughout the regenerating cycle. Thus, all of the air diverted into the tower being regenerated was constantly exhausted to the atmosphere.

By alternately opening and closing purge valve 50 tower 14 is alternately pressurized and depressurized thus allowing the dry air passing through it to absorb moisture more quickly with less purge flow. The pulsed flow caused by opening and closing purge valve 50 also reduces the amount of dry air released to atmosphere and thus greatly reduces the amount of dry air needed to regenerate the desiccant in the tower. While prior regeneration methods utilized up to 15% of the dry air generated by the drying tower, the present system utilizes approximately 6% of the dry air generated by the drying tower.

As shown in FIG. 2, immediately prior to each tower changing from a regeneration cycle to a drying cycle, a fourth timer cam switch activates valve 29 to allow a portion of the dry air which would normally exit outlet 28 to flow into the tower which is changing from a regeneration cycle to a drying cycle. While this is happening, the corresponding purge valve for that tower is closed so that the tower is pressurized. This occurs immediately prior to the opening of the corresponding inlet valve for that tower and insures that the tower will be at approximately the same pressure as the saturated air entering the bottom of the tower so that the desiccant is not disturbed by a sudden rush of moisture laden air.

While the above description has been limited to a heatless type twin tower gas dryer, the inventors contemplate that a similar apparatus could be used in a heat type gas dryer.

Various modes for carrying out the invention are contemplated as being within the scope of the following claims particularly pointing out and distinctly claiming the subject matter which is regarded as the invention.

We claim:

1. A method of drying gas in an apparatus having at least two desiccant containing towers which alternately receive moisture saturated air to be dried during a drying phase and then receive dry air during a regenerating phase to regenerate the desiccant which had previously adsorbed moisture from saturated air during the drying phase, said method comprising:

introducing saturated air into one of the towers during its drying phase and passing the saturated air over the desiccant so that dry air exits the tower, introducing a portion of said dry air from said one tower into the other of said towers during the regenerating phase of said other tower and passing said dry air over the desiccant which had previously adsorbed moisture during its drying phase so that said dry air absorbs moisture from the desiccant and regenerates the desiccant, and alternately pressurizing and depressurizing said other tower in its regenerating phase so that the air in said other tower is periodically allowed to expand thus absorbing even greater moisture from said desiccant.

2. The method of claim 1 wherein said gas drying apparatus includes a purge valve for releasing the air used during regeneration and said pressurizing and depressurizing comprises alternately opening and closing the purge valve which releases the air from said other tower so that the amount of air released from said other tower is limited.

3. The method of claim 2 further comprising using less than ten percent (10%) of the total dry air generated by said one tower for introduction into said other tower.

* * * * *